July 16, 1935.  L. G. SYMONS  2,008,648
SCREEN
Filed July 18, 1934   5 Sheets-Sheet 2
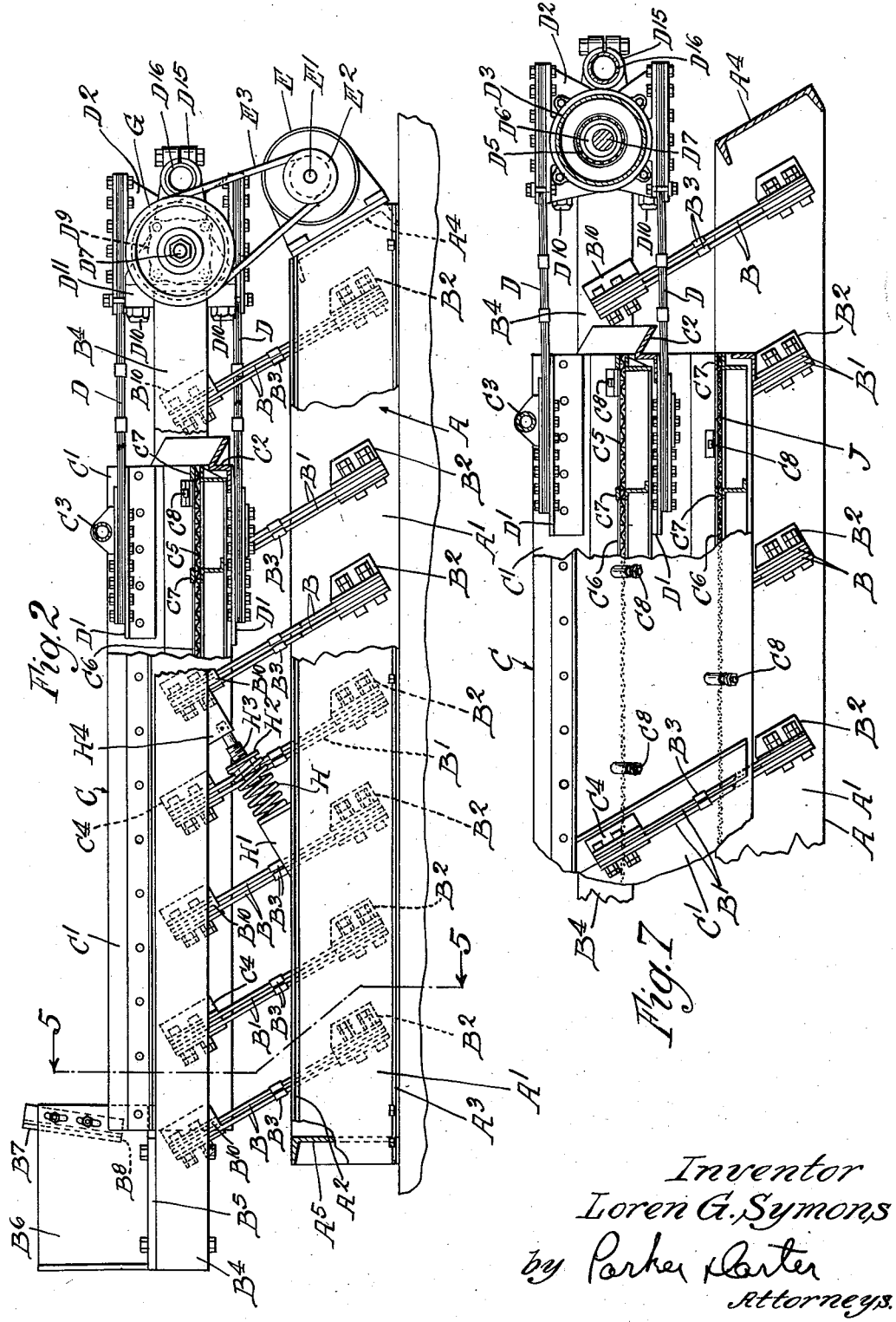
Inventor
Loren G. Symons
by Parker Carter
Attorneys.

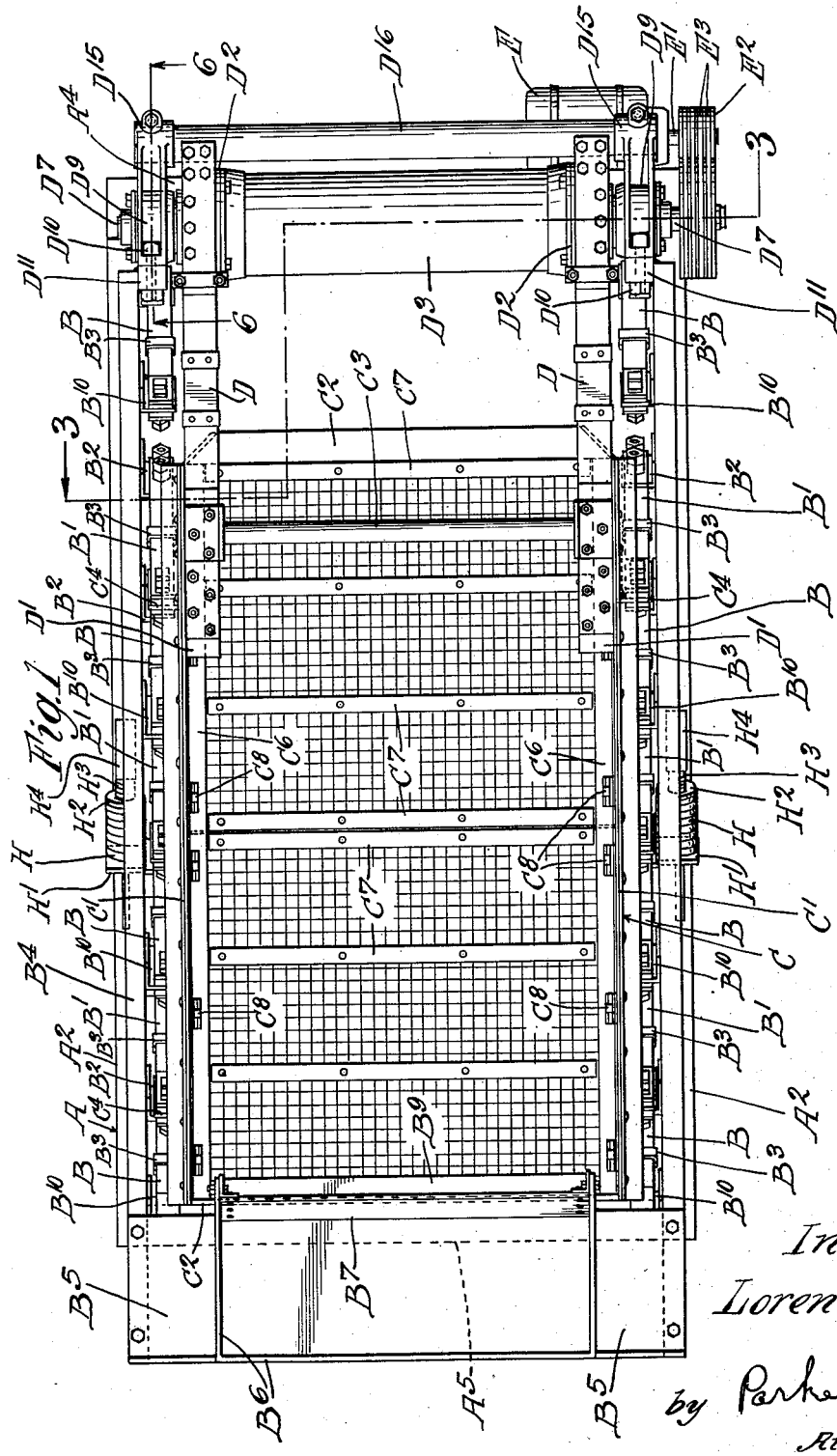

July 16, 1935.  L. G. SYMONS  2,008,648
SCREEN
Filed July 18, 1934  5 Sheets-Sheet 3
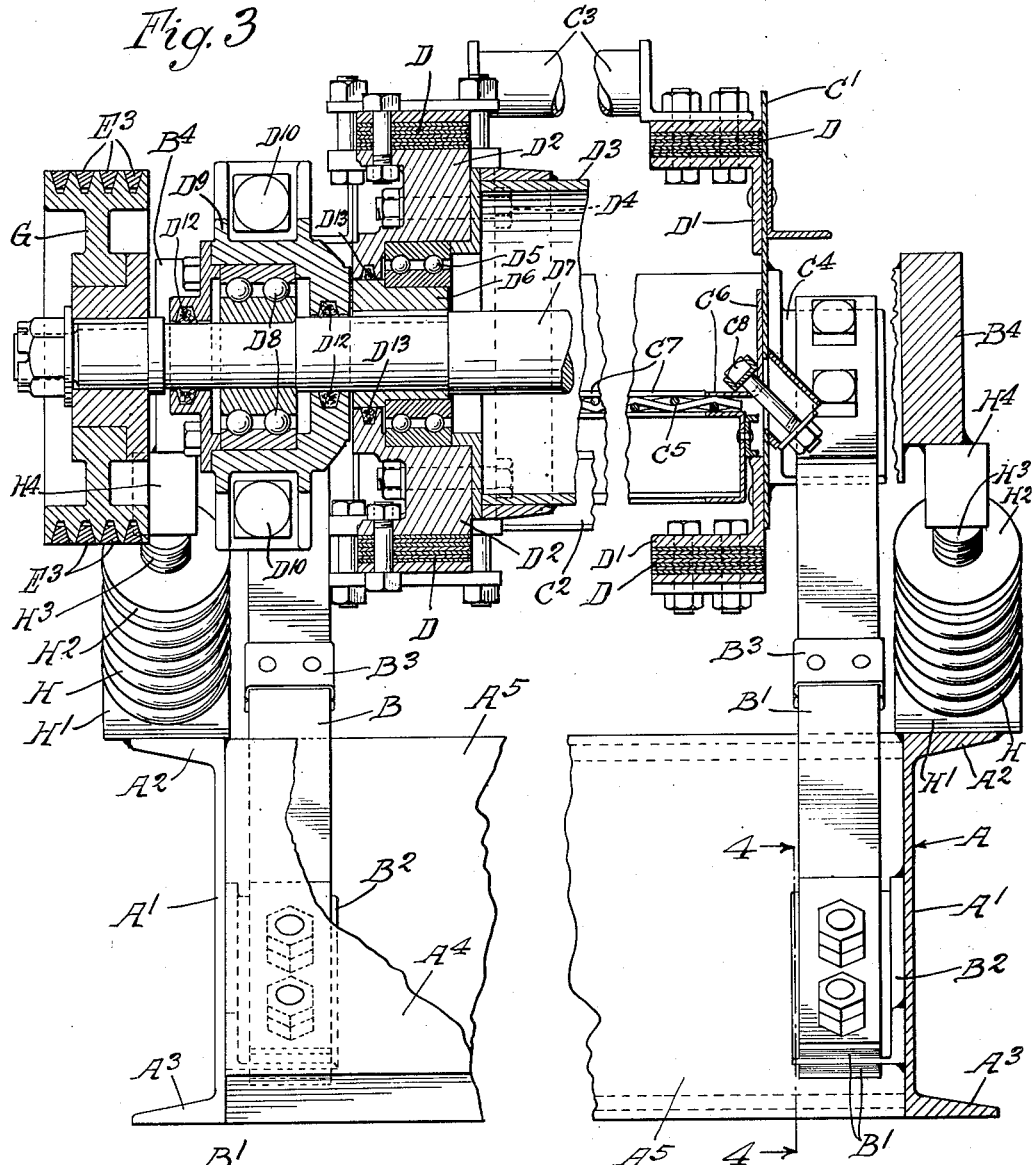
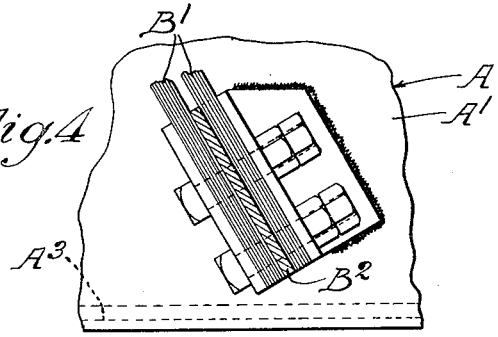
Inventor
Loren G. Symons
by Parker & Carter
Attorneys July 16, 1935.  L. G. SYMONS  2,008,648
SCREEN
Filed July 18, 1934   5 Sheets-Sheet 4
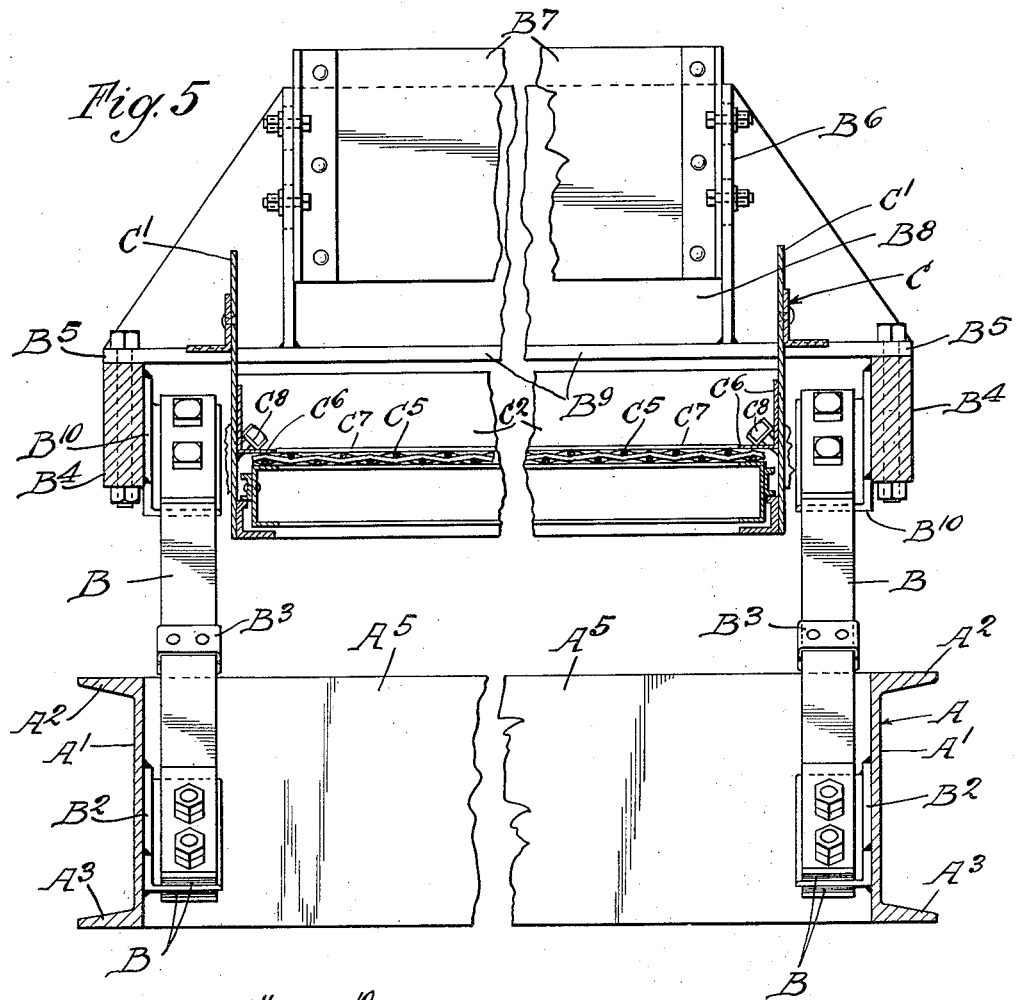
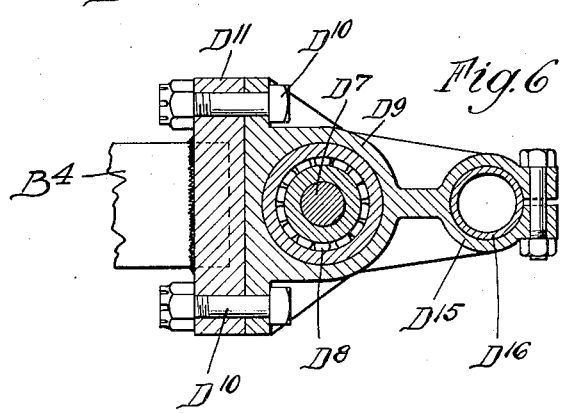
Inventor
Loren G. Symons
by Parker Carter
Attorneys.

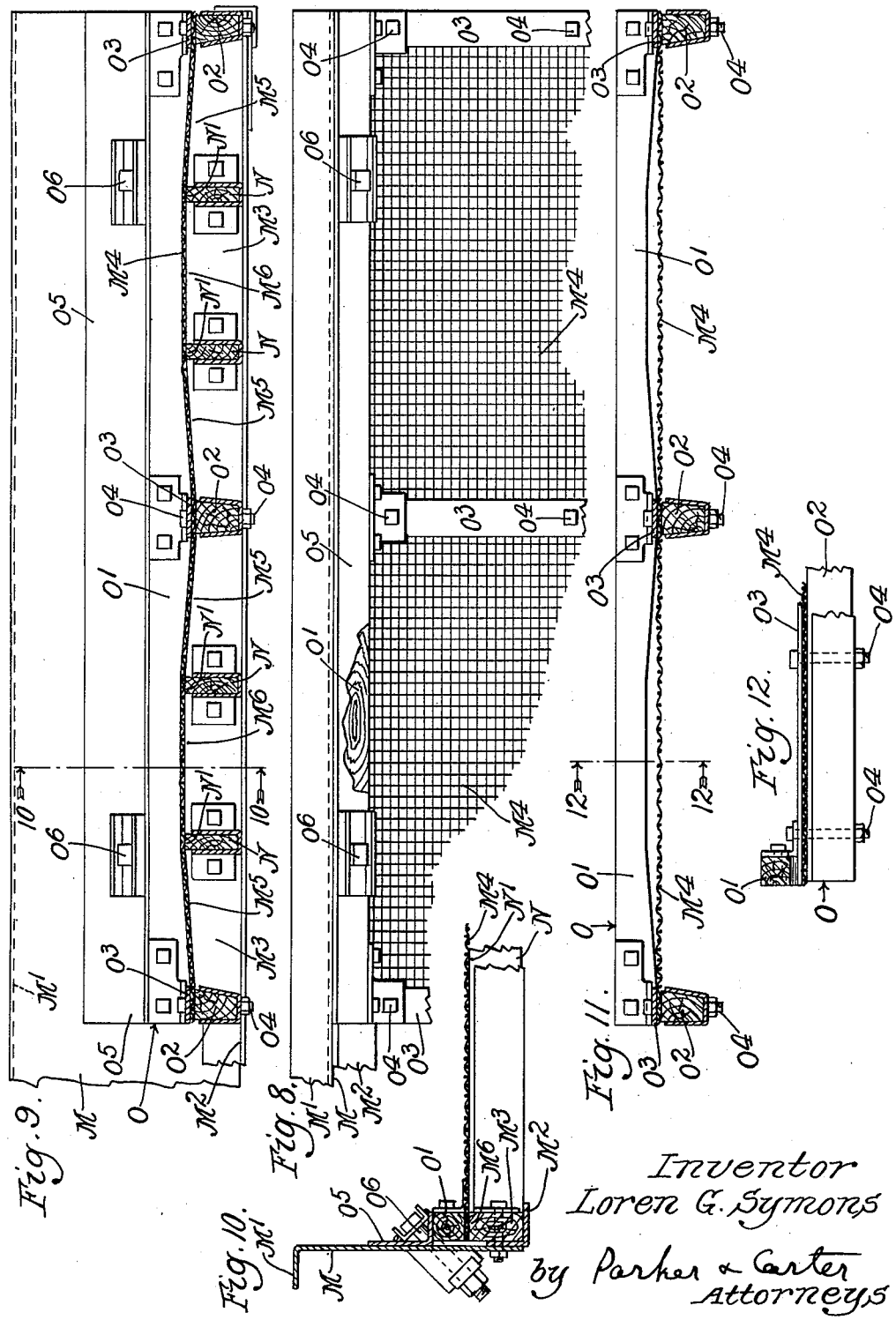

Patented July 16, 1935

2,008,648

UNITED STATES PATENT OFFICE 2,008,648

SCREEN

Loren G. Symons, Hollywood, Calif., assignor to Symons Brothers Screen Company, Hollywood, Calif., a corporation of Delaware Application July 18, 1934, Serial No. 735,724

9 Claims. (Cl. 209—367)

My invention relates to an improvement in screens or material separating devices, and has for purposes the provision of a screen which shall be economical to manufacture, easy to operate, durable, and highly efficient in operation. Another object is the provision of an improved vibrating means for screens. Another object is the provision of improved supporting means for screens and for the driving mechanism thereof. Another object is the provision of improved feeding means for screens. Another object is the provision of improved balancing means.

Other objects will appear from time to time in the course of the specification and claims.

I illustrate my invention more or less diagrammatically in the accompanying drawings, wherein—

Figure 1 is a plan view of my invention;

Figure 2 is a side elevation with parts broken away and parts in section;

Figure 3 is an enlarged section taken on the line 3—3 of Figure 1;

Figure 4 is a section taken on the line 4—4 of Figure 3;

Figure 5 is an enlarged section along the line 5—5 of Figure 2;

Figure 6 is an enlarged section taken on the line 6—6 of Figure 1;

Figure 7 is a partial vertical section of a variant form;

Figure 8 is a partial plan view illustrating readily removable means for holding screen cloth in place;

Figure 9 is a longitudinal section through the structure shown in Figure 8;

Figure 10 is a section on the line 10—10 of Figure 9;

Figure 11 is a section similar to Figure 9 but illustrating the removable screen cloth mounting means prior to its having been placed in position; and Figure 12 is a section on the line 12—12 of Figure 11.

Like parts are indicated by like symbols throughout the specification and drawings.

Referring to the drawings, A generally indicates any suitable base which may, for example, be formed by generally parallel channels $A^1$ with bottom flanges $A^2$ and top flanges $A^3$. It will be noted that the channels terminate in inclined edges at the discharge edge of the screen and are connected by an inclined member $A^4$. The opposite end may be connected by any suitable transverse member $A^5$.

Inclining upwardly from the side base members $A^1$ are two sets of springs which I have indicated respectively as B and $B^1$. Both sets may be clamped to the main fame by means for example of angles $B^2$ which may be welded to the main frame. Each spring is formed of several thin laminations, preferably not over $\frac{1}{16}$ of an inch in thickness, which may be bolted or otherwise secured together. I illustrate, for example, securing clamps $B^3$. The springs B are associated with and are bolted to the angles $B^{10}$ which may be welded to the longitudinal bars or weights $B^4$, as illustrated in Figure 5. One of these bars or weights $B^4$ extends along each side of the base. At the feed end of the screen the bars are connected by a transverse frame member $B^5$ mounted upon or associated with which is a feed box $B^6$ with a movable inclined gate $B^7$ adapted, in response to its movement, to open up a feed aperture $B^8$. $B^9$ is any suitable feeding bottom or lip for the feed box.

C indicates the main frame of the screen proper. It includes side frame members $C^1$ and end members $C^2$ and any suitable transverse bracing member $C^3$. It is mounted upon the upper ends of the springs $B^1$ which may be bolted to it for example to angles $C^4$ which may be welded to the main deck or to the side members $C^1$. $C^5$ indicates any suitable screen cloth on the deck which may be held down for example by side strips or clamps $C^6$ and transverse strips $C^7$. Bolts $C^8$ serve to secure the screen structure to the side frame members $C^1$. It will be understood that the details of the screen cloth and screen securing means do not form, of themselves, part of the invention intended to be covered by the present application, the details being reserved for protection by another application shortly to be filed. It will be noted, however, that the screen deck underlies the feed box $B^6$ so that material in the feed box is delivered to the feed end of the screen.

Extending from the ends of the side frame members $C^1$ are connecting rod springs generally indicated as D. These are also laminated springs and are secured at one end to angles or brackets $D^1$ bolted or welded to the screen frame. The four springs D are arranged in pairs, one pair at each side of the screen. One spring of each pair is secured to the top of the screen frame and one to the bottom. The opposite ends of the springs are bolted or clamped to housing end members $D^2$. The housing end members are connected by a housing cylinder $D^3$ to which they are bolted as by the bolts $D^4$. Mounted in each housing end member $D^2$ is a ball bearing $D^5$ for an eccentric sleeve $D^6$ keyed to a driven shaft $D^7$, illustrated in detail in Figure 3. The shaft is mounted by means of any suitable ball bearings $D^8$ in bearing housings $D^9$ which in turn are secured by bolts $D^{10}$ to abutments members $D^{11}$. The abutment members $D^{11}$ may be welded or bolted to the longitudinal bars or weights $B^4$. It will be realized from the above description that the shaft $D^7$ is supported by the longitudinal bars $B^4$, whereas the screen is vibrated by means of the eccentric sleeves $D^6$. Any suitable packing means $D^{12}$ in the bearing housings $D^9$ and packing means $D^{13}$ for the eccentric sleeves $D^6$ in the housing $D^2$ may be employed to prevent dust from entering the ball bearings. The bearing housings $D^9$ are further provided with split bearing brackets $D^{15}$ for a transverse bracing sleeve $D^{16}$ illustrated in detail in Figures 1 and 6.

E indicates any suitable motor having a rotary shaft $E^1$ and a pulley $E^2$. It may be mounted for example to the inclined end member $A^4$. It is advantageous to so mount the motor that its driving belt $E^3$ extends along a plane generally parallel with the springs B, $B^1$. In such case vibration of the screen does not substantially slacken the belt.

The main driven shaft $D^7$ is provided with a pulley G about which passes the belt or belts $E^3$. In order to hold the screen deck and the weights $B^4$ in neutral position I may employ coil springs H mounted on brackets $H^1$ on the flange $A^2$ of the side members $A^1$ and compressed against abutments $H^2$ adjustable along the screw threaded member $H^3$ secured to a bracket $H^4$ upon the weights or bars $B^4$. The effect of the springs H is that as the screen operates, the springs B and $B^1$ will vibrate in equal amounts in each direction from their neutral axis.

It will be understood that any desired number of screen surfaces may be employed. In Figures 1, 2 and 5 I illustrate a single deck screen. In Figure 7 I illustrate a variation, otherwise identical, in which two decks or two screening surfaces $D^5$ and J are employed. It will be understood that either may be employed or an even larger number of screen surfaces.

Referring to Figures 8 to 12 inclusive, I illustrate an improved means for holding screen cloth in position, which is particularly applicable to fine screen cloth and which permits its very ready and easy application to and removal from the screen. The side frame member of the screen proper is indicated as in Figure 10 as M, having an outwardly extending flange $M^1$ at its upper edge, provided also with a lower flange $M^2$ which may be in the form of an angle iron and which may be welded or otherwise secured to it and projects inwardly along its lower edge. $M^3$ are wooden pieces that are bolted to the side of the frame M in order to furnish a support for the wire cloth and to prevent the material from escaping between the side of the frame and the edge of the wire cloth. $M^4$ indicates any suitable wire cloth the edge of which is laid upon the upper faces of the wooden members $M^3$. It will be observed, as in Figure 9, that the contours of the members $M^3$ vary from the horizontal including upward inclines $M^5$ connected by horizontal portions $M^6$.

N indicates cross members extending between the members $M^3$ and having upper surfaces $N^1$ which receive the screen cloth $M^4$. These upper surfaces $N^1$ conform to the upper portions $M^6$ of the upper faces of the wooden members $M^3$.

O generally indicates a removable frame which includes wood side members $O^1$ and transverse members $O^2$. The wooden side members $O^1$ conform to the faces $M^5$ $M^6$ of the wooden members $M^3$ of the fixed screen frame. It will be observed that the screen cloth $M^4$, prior to being positioned in place upon the members $M^3$, is secured to the removable frame and is stretched on a straight line and bolted or otherwise secured in place, as shown in Figure 11. It may, for example, be bolted down as by the transverse strips $O^3$ held by bolts $O^4$ passing through the supports $O^2$. Thereby the screen cloth $M^4$ is tightly secured at its ends and, if desired, at the intermediate transverse supports $O^2$. The removable frame O is then positioned as a unit with the side members $O^1$ overlying the wooden side members $M^3$ of the fixed screen. The side members $O^1$ are then drawn down as by the angles $O^5$ which are clamped in position by the inclined bolts $O^6$ as shown, for example, in Figure 10. As the subframe or removable frame O is thereby drawn down into clamping position the wire cloth $M^4$ is deflected upwardly and stretched. The amount of stretching depends on the difference in height between the members $O^2$ and N. As the height of the members $O^2$ fixes the height of the lowest portions of the screen $M^4$, the height of the transverse members N fixes the height of the highest portions of the screen cloth. In addition, the side members $M^3$ and $O^1$ serve as clamping means for firmly clamping the edge of the screen cloth.

It will be understood that the difference in height between the members $O^2$ and N may be varied according to the stiffness of the wire to be stretched. For instance, with very fine wire this distance would not have to be over three or four inches in a normal sized screen, but with wire as coarse as $\frac{1}{8}$ of an inch this difference might be as great as six inches.

It will be realized that whereas I have shown a practical and operative device, nevertheless many changes may be made in the size, shape, and number of parts without departing from the spirit of my invention. I therefore wish my description and drawings to be taken as in a broad sense illustrative and diagrammatic rather than as limiting me to my specific showing.

The use and operation of my invention are as follows:

I provide a screen in which the vibration is transmitted to the base practically not at all and in which the efficiency of the cleaning or screening action is out of line with and vastly superior to that of prior art screens. I employ, for example, the fixed base A which in practice vibrates so little that it does not have to be bolted down to the floor. Mounted upon inclined leaf springs on this space A are two members, namely the screen deck or screen proper and an actuating member for it which includes two longitudinally extending balancing weights or beams $B^4$, a feed box $B^6$ secured to that and a vibrating mechanism herein shown as a shaft $D^7$ having eccentrics $D^6$. This vibrating plant is connected to the screen by two vertically spaced horizontal leaf springs D at each side of the screen frame. This provides a singularly flexible and efficient connection. As the shaft $D^7$ is rotated by the pulley G the effective length of the connection between the power plant and the screen is varied and the result is a very rapid vibration. As both the power plant and weights $B^4$ and the screen itself are mounted on inclined leaf springs, thus being bolted on the fixed base, the fixed base itself is not vibrated. The springs D, in their vertically spaced pairs, are a singularly efficient and flexible actuating connection.

The coil springs H are used to hold the screen and the weights in a neutral position, so that as the screen operates the leaf springs upon which the screen and weights are supported will vibrate an equal amount in each direction from their neutral position.

The weights or bars B⁴ furnish the inertia necessary for driving the screen deck. The transverse support D¹⁶, in connection with its associated parts, is an exceedingly efficient means of lining up the power plant and the cylindrical housing D³ with the end members D² is a very efficient housing arrangement. Fastening the members or connectors D above and below the center of the screen, as shown in Figure 2, causes them to bend in an S shape. This S bend throws the same stress or strain on each leaf of each individual spring, which would not be the case if only one set of springs were used, and if the connection were disposed on a central line of the bearings, one connection being above and one below the bearings, as shown in Figure 2, unequal strain is avoided. Each spring is made up of a sufficient number of layers for strength, with the metal thin enough indefinitely to withstand the bending moment. The coil springs H relieves the inclined leaf springs from supporting the load which might cause them to bend or sag when the screen is quiet, the coil spring keeping the leaf springs vibrating each way from a neutral point.

In practice I find it exceedingly efficient to have the feed box or shaking feed hopper B⁶ mounted on the weights B⁴. The inclined gate B⁷ permits regulation of the feed and the result is a very efficient and even feeding of material to the screen.

An advantage of the removable sub-frame structure shown in Figures 8 to 12 inclusive is that an extra removable frame O can be furnished with very little expense, and the wire cloth M⁴ bolted to it and laid away ready for quick change when repairs are necessary. In the second place, it is not necessary to take great pains in stretching the wire cloth M⁴ on the removable frame O, as the bars or transverse supports N will take up all slack when the frame O is bolted in place. The bolting in place of the removable frame O first stretches the wire and then clamps it in place on the sides, making it possible to get a perfectly even tension over every square foot of the surface of the wire cloth. It is kept securely clamped in that position.

I claim:

1. In a vibratory screen, a base, a screen deck yieldably mounted on said base, inclined leaf springs upon which said screen deck is supported, a weight yieldably mounted upon said base, inclined leaf springs upon which said weight is supported, the angle of inclination of the two sets of springs being substantially the same, the springs being parallel with each other, and a vibrating actuating connection interposed between the weight and the screen deck, and means for actuating it, and yielding means tending normally to hold the leaf springs in neutral position, including coil springs mounted upon and compressed against the base.

2. In a balanced vibratory screen, a support, a screen deck yieldably supported on said support, a plurality of springs supporting said deck, a counterweight yieldably supported upon said support, a plurality of similar springs supporting said counterweight, said counterweight lying in the general plane of the screen deck and in general parallelism therewith and extending substantially from end to end therealong, with one end of said counterweight extending outwardly beyond the corresponding end of the screen deck, vibrating means mounted upon said end of the counterweight and a yielding connection between said vibrating means and the adjacent end of the spring deck, said yielding connection extending outwardly beyond the end of the screen deck.

3. The structure of claim 2 characterized by the employment of a yielding connection including a plurality of leaf spring connections between the vibrating means and the screen deck, some of said connections being above and some below the effective screening level of the screen deck.

4. The structure of claim 2 characterized by the employment of a counterweight including two bars extending longitudinally, one along each side of the screen deck, the bars being connected at their ends beyond each end of the screen deck.

5. The structure of claim 2 characterized by the employment of a feed chute located upon the counterweight adjacent one end of the screen deck.

6. The structure of claim 2 characterized by the employment of a feed chute located upon the counterweight adjacent the end of the screen deck opposite to the connection between the screen deck and the vibrating means.

7. The structure of claim 2 characterized by the employment of a counterweight including two bars extending longitudinally, one along each side of the screen deck, and a housing interposed between the ends of said bars, an eccentric associated with said housing, and means for actuating it, and a yielding connection between the opposite ends of said housing and said screen deck which includes a pair of leaf spring connections at each end thereof, the upper leaf spring connection of each pair being located above the effective screening level of the screen deck and the lower of each pair being located below the effective screening level of the screen deck, the eccentric being rotatably mounted upon the ends of said counterweight bars.

8. The structure of claim 2 characterized in that the said yielding connection includes a plurality of flexible spring connections extending in general parallelism with the plane of the screen, one being positioned above and one below the axis of the vibrating means.

9. The structure of claim 2 characterized in that the said yielding connection includes a plurality of flexible spring connections extending in general parallelism with the plane of the screen, one being positioned above and one below the axis of the vibrating means, there being a pair of said spring connections at each side of the end of the screen deck.

LOREN G. SYMONS.